United States Patent [19]

Jones et al.

[11] 4,402,441

[45] Sep. 6, 1983

[54] MUSICAL INSTRUMENT CARRIER

[76] Inventors: Russell S. Jones, 927 Stocker Ave., Flint, Mich. 48503; Albert R. Casavant, Box 685, Chattanooga, Tenn. 37401

[21] Appl. No.: 223,810

[22] Filed: Jan. 9, 1981

[51] Int. Cl.³ .............................................. G01G 5/00

[52] U.S. Cl. ...................................... 224/265; 84/327; 84/403; 84/421; 224/270; 224/910

[58] Field of Search ..................... 84/327, 403, 411 R, 84/421; 224/910, 907, 265, 270, 271, 272, 264, 266, 210, 211, 212, 213, 260, 261

[56] References Cited

U.S. PATENT DOCUMENTS

| | | | |
|---|---|---|---|
| 909,217 | 1/1909 | Presba | 224/265 X |
| 2,484,383 | 10/1949 | Lee | 224/270 X |
| 2,643,039 | 6/1953 | Sottile | 224/910 X |
| 2,760,699 | 8/1956 | Rivers-Macpherson | 224/265 |
| 2,861,854 | 11/1958 | Best | 224/270 X |
| 3,030,109 | 4/1962 | Albitz | 224/265 X |
| 3,057,526 | 10/1962 | Jaquith . | |
| 3,106,123 | 10/1963 | Johannsen | 224/910 X |
| 3,272,056 | 9/1966 | Dean | 84/403 |
| 3,774,823 | 11/1973 | Hoellerich | 224/910 X |
| 4,256,007 | 3/1981 | Streit | 224/910 |

FOREIGN PATENT DOCUMENTS

| | | | |
|---|---|---|---|
| 943106 | 2/1949 | France | 224/265 |
| 1423486 | 11/1965 | France | 224/264 |
| 223796 | 12/1968 | Sweden | 224/266 |

OTHER PUBLICATIONS

Copy of Advertising Sheet for "Mallett Carrier", Cym-Spin Co.

Flat Jacks (Catalog), pp. 1-3, 4/16/64.

Design Advertising Sheet (2 Pages), Division of Slingerland Drum Co.

Copy of McCormick's Catalog, p. 3.

*Primary Examiner*—Allan N. Shoap

*Attorney, Agent, or Firm*—Gifford, Van Ophem, Sheridan & Sprinkle

[57] ABSTRACT

A musical instrument carrier comprising a support frame having shoulder pads, a front body engaging pad and a support frame securing the shoulder pads rearwardly of and above the front body engaging pad. The frame includes a pair of tubular members extending outwardly from the body engaging pad and dimensioned to receive a rod-like end portion of an instrument holder. The holder is shaped to engage an appropriate spot on the musical instrument such that the rod-like end portions register with the outwardly extending tubular members.

9 Claims, 4 Drawing Figures

MUSICAL INSTRUMENT CARRIER

BACKGROUND OF THE INVENTION

I. Field of the Invention

The present invention relates generally to musical instrument carriers and, more particularly, to such a carrier which engages a musician's body so that the instrument can be transported by the musician while the instrument is being played.

II. Description of the Prior Art

It is often necessary to provide musical instruments with a support stand in order to position the instrument in a convenient and operable position for the musician. This is especially true of percussion instruments which require the use of both hands of the musician and which, thus, cannot be easily held by the musician during a performance. Although some instruments can be easily supported by a strap around the neck of the musician or a belt clip secured to the musician's belt, such a support is not well adapted for use with percussion instruments such as marimbas, vibraphones, drums and the like.

One previously known support frame for percussion instruments comprises a frame made of tubing which rests on the ground surface and supports an instrument a predetermined distance above the ground surface. Such a support is disadvantageous in that it is not easily transported by the musician himself and often requires at least one person at each end to lift and carry the musical instrument from place to place. Such a device is disadvantageous for use in marching bands in which a variety of marching formations are formed by the participants while music is being played. These previously known support stands significantly restrict mobility of percussion instruments.

Another known type of instrument carrier comprises a pair of bars which have curved end portions adapted to engage the top of the musician's shoulders. The bars extend downwardly over the front of the musician's body and are secured to a cushioning pad which rests against the front of a musician's body. The bars are further connected to a platform frame upon which the instrument is placed and to which the instrument is secured. However, these previously known instrument carriers are disadvantageous in that the platform frame increases the bulk and suspended weight of the carrier and, therefore, increases the discomfort of the musician while marching and decreases mobility of the musician. Moreover, the framing platform is not readily adaptable for use with a wide variety of musical instruments whereby the instruments to be carried by the carrier can be interchanged quickly and easily.

SUMMARY OF THE PRESENT INVENTION

The present invention overcomes the above mentioned disadvantages by providing an instrument carrier which is easily positioned upon and supported by the body of a musician. The carrier generally comprises a support frame having a pair of shoulder engaging members which fit over the top portion of the musician's shoulders. The frame also includes a body engaging member which rests against the front surface of the musician's body.

The frame includes at least one, and preferably two, tubular members which extend outwardly away from the front of the musician's body so that they can slidably receive at least a portion of elongated support members which can be secured to the instrument in an unobstructing position.

The carrier is adjustable for different body sizes since the height of the shoulder engaging portions can be adjusted with respect to the body engaging portion. In addition, the shoulder engaging portions are provided with longitudinal ribs which increase the rigidity and strength of the shoulder engaging portions although the shoulder engaging portions are wide enough to spread the load of the carrier across a large portion of the shoulders so that pressure upon the shoulders is more evenly distributed. Consequently, the shoulder engaging portion of the carrier of the present invention is more comfortable than previously known instrument carriers.

In addition, unlike previously known instrument carriers, the present invention provides instrument engaging means which do not interfere with depending tone pipes which extend below the base of the instrument and which permits easy and quick attachment of the instrument to the carrier.

BRIEF DESCRIPTION OF THE DRAWING

The present invention will be more clearly understood by reference to the following detailed description of a preferred embodiment of the present invention when read in conjunction with the accompanying drawing in which like reference characters refer to like parts throughout the several views and in which.

DETAILED DESCRIPTION OF A PREFERRED EMBODIMENT OF THE PRESENT INVENTION

Figure 1:
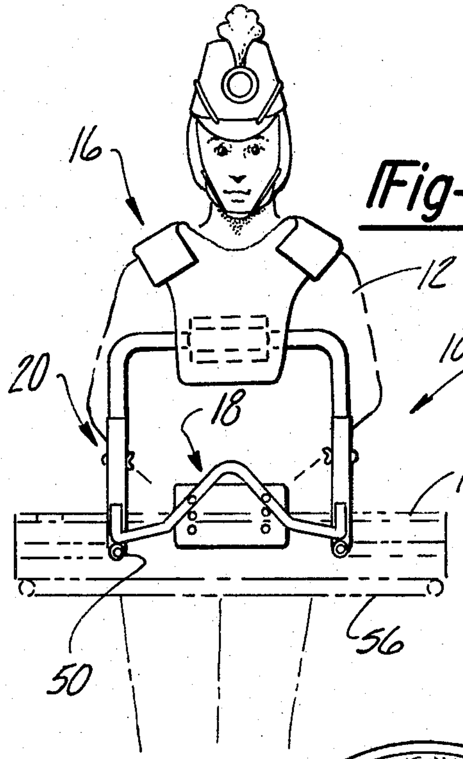
FIG. 1 is a front elevational view of a preferred embodiment of the musical instrument carrier of the present invention.

Referring now to FIG. 1, the present invention 10 is thereshown supported by a musician's body 12 and holding a musical instrument such as the xylophone 14. The carrier generally includes a shoulder engaging portion 16, a body engaging portion 18 and an instrument engaging frame portion 20.

Figure 2:
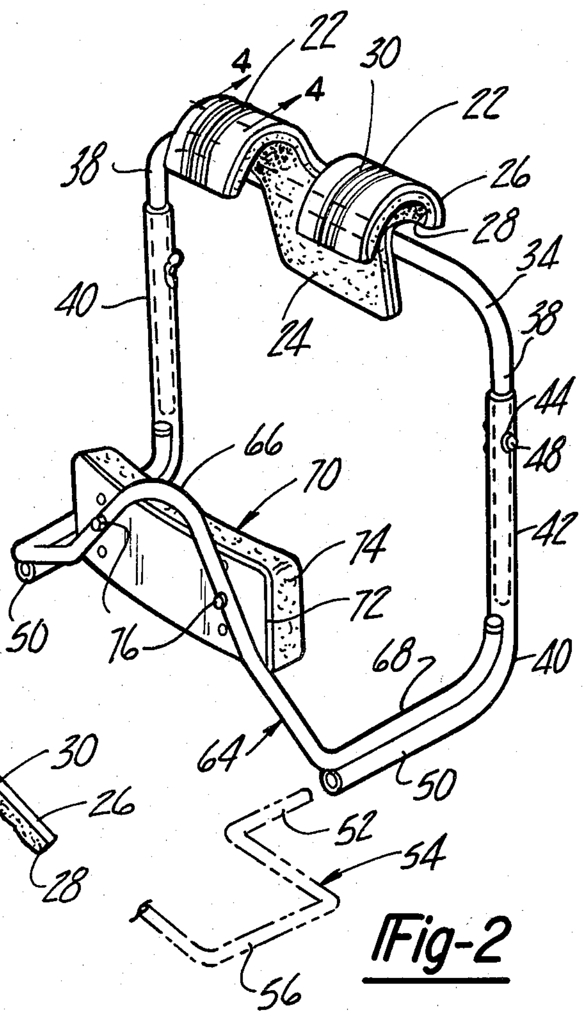
FIG. 2 is a perspective view of the instrument carrier shown in FIG. 1.

As best shown in FIG. 2, the shoulder engaging portion 16 comprises a pair of spaced apart shoulder engaging pads 22 which are connected by depending back engaging pad portion 24 at their rearmost ends. Preferably, the pads 22 and the back engaging portion 24 are unitarily constructed and include a substantially rigid outer cover plate 26 laminated to a soft resilient pad 28.

Figure 3:
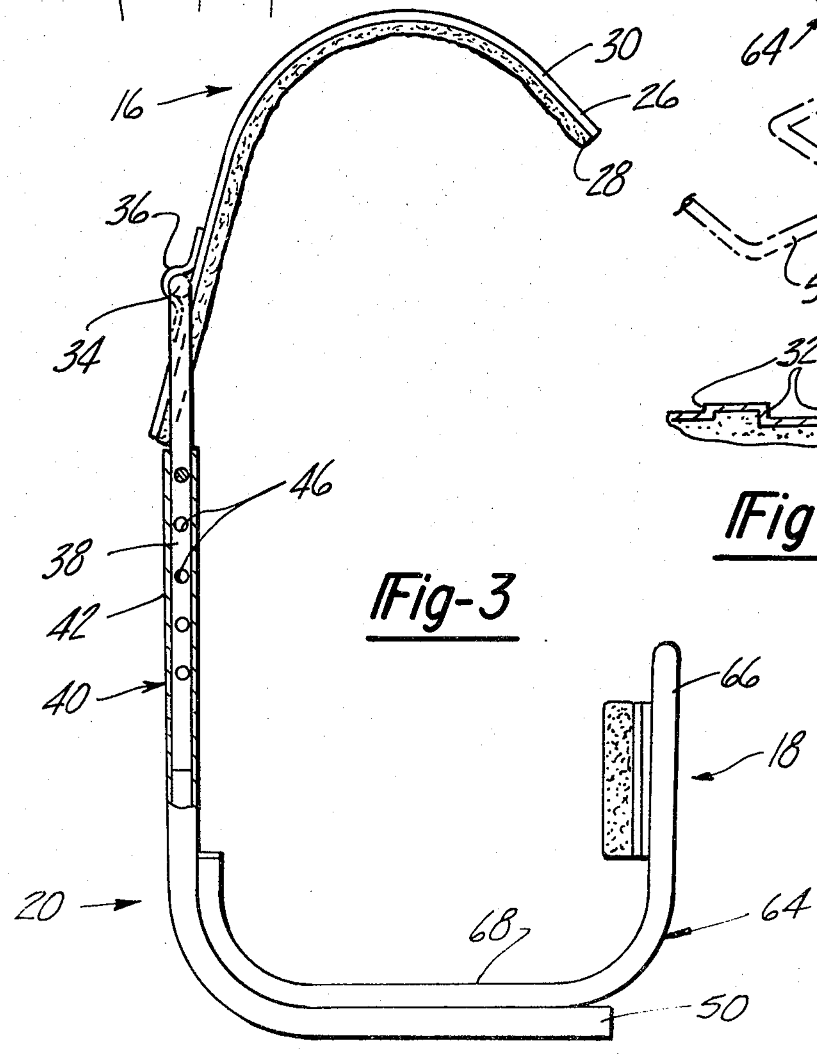
FIG. 3 is a side elevational view of the instrument carrier shown in FIGS. 1 and 2 and having a portion broken away for clarity.
Figure 4:
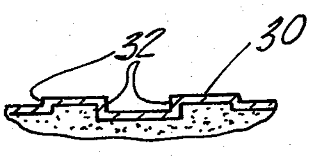
FIG. 4 is a fragmentary sectional view of the carrier taken substantially along the line 4—4 in FIG. 2.

The outer plate 26 includes longitudinally extending ribs 30 which extend over substantially the entire length of the shoulder pads 22 and the back engaging portion 24 (see FIG. 3). As best shown in FIG. 4, the ribs include side wall portions 32 which increase the rigidity of the outer plate 26. The entire shoulder engaging portion 16 is secured to a cross bar 34 by a bracket 36. The bracket 36 includes a U-shaped channel which receives the bar 34 therein and includes two end flanges which are secured to the back engaging portion 24 of the shoulder engaging means 16 such that a portion of the back engaging portion 16 extends below the cross bar 34 while the entire portion 24 lies between the bar 34 and the body of the musician.

The cross bar 34 includes a pair of parallel end portions 38. Each end portion 38 is slidably received in an end of one of a pair of tubular substantially L-shaped members 40. The upper portion 42 of each L-shaped member 40 includes a diametric aperture 44 therethrough. The end portions 38 of the bar 34 include a plurality of axially spaced, diametric apertures 46 which selectively register with the apertures 44 in the portion 42 of the member 40. A bolt member 48 is slidably received in registering apertures 44 and 46 to lock the end portions 38 and thus the cross bar 34 in a fixed position with respect to the tubular member 40.

An end portion 50 of the tubular member 40 extends substantially orthogonally from the upper portion 42 so that the open end of the tubular portion 50 faces away from the body of the musician. A second cross member 64 includes a raised central portion 66 and a pair of side legs 68. The side legs 68 are angled with respect to the central portion 66 so as to extend along the outer periphery of the tubular end 50 of the member 40. A support pad 70 is secured to the raised central portion 66 of the bar 64 and comprises a back plate 72 and a pad 74 which faces rearwardly of the bar 64. The pad 70 is secured to the central portion 66 by means of screws 76 or the like.

The tubular end 50 of member 40 is dimensioned to slidably receive the straight-leg portion 52 of the instrument holder 54. Preferably, a locking means similar to the locking bolt 48 can be used to lock the holder 54 with respect to the end portion 50 of the tubular member 40.

As shown in FIG. 1, a xylophone 14 can be secured to the carrier 10 by a holder 54 having a pair of end legs 52 received in the tubular ends 50 of the members 40. The holder 54 has a portion 56 which conforms to the outline of the xylophone 14 and the xylophone rests on top of the portion 56 of the holder 54 as can best be seen in FIG. 1. It is to be understood that the holder 54 will be of different shapes and support different percussion instruments. It is only important that the holder 54 include the straight-leg portions 52 which can be registered with and inserted within the tubular ends 50.

Having thus described the important structural features of the instrument carrier shown in the drawing, the operation of that device is now easily described.

The carrier 10 is constructed by welding or otherwise fastening the legs 68 of the bar 54 to the tubular ends 50 of the member 40 so that the raised portion 66 of the bar 64 extends above the end portion 50 of the tubular member 40. The pad 70 is secured to the raised central portion 66 of the bar 64 by the fasteners 76. The ends 38 of the bar 34 are slid into the ends 42 of the tubular members 40 and locked into position by the fasteners 48. The back portion 24 of the shoulder engaging means 16 is secured to the bar 34 by the bracket 36 so that the shoulder engaging pads 22 extend above and over the end portions 50 of the tubular members 40. The bracket 36 tightly engages the bar 34 so that pivotal movement between the shoulder engaging means 16 and the remainder of the frame is eliminated. Although the extent to which the shoulder pads 22 extend outwardly over the tubular members 50 is adjustable by loosening the bracket 36, the bracket remains tightened in a particular position while the carrier is adapted for use on a particular individual.

Once the device has been so constructed, the frame is easily lifted over the head of the musician and lowered until the shoulder pads 22 rest upon the shoulders of the musician and the pad 70 rests against the front of the musician's torso. The height of the pad 70 is easily adjustable by removing the bolts 48 and sliding the bar ends 38 until the apertures 44 are aligned with a convenient pair of apertures 46 in the bar ends 38 so that the bolt 48 can be reinserted through the apertures 44 and 46 to lock the members 34 and 40 in position.

The instrument holder 54 is attached to the frame by inserting the ends 52 of an appropriately shaped holder 54 into the openings in the tubular ends 50 of the bars 40. The ends 52 are then frictionally engaged or otherwise secured within the tubular end portions 50 and the xylophone or other instrument is supported on top of the holder 54.

The instrument is thus easily transported while being supported in a position which enables the musician to easily play the instrument while the musician performs marching maneuvers. Although the invention has been particularly described for use in carrying a xylophone 14, it is to be understood that a wide variety of percussion instruments can be carried by the device so long as each instrument holder 54 is appropriately dimensioned such that the ends 52 register with the openings in the end of the tubular portion 50 of the member 40.

Having thus described our invention, many modifications thereto will become apparent to those skilled in the art to which it pertains without departing from the scope or spirit of the present invention as defined in the appended claims.

What is claimed is:

1. A musical instrument carrier to be supported by the torso of a musician for transport of an instrument while the instrument is being played, said carrier comprising:

a first means for extending over and engaging the shoulders of the musician;

a second means for abuttingly engaging the front torso of the musician;

a third means for connecting said first means to said second means; and a fourth means connecting with said third means for supporting the instrument adjacent the front torso of the musician, said third means including means for adjustably and rigidly connecting said first means with respect to said second means to accommodate musicians of different sizes and shapes, said third means further comprising a pair of substantially L-shaped tubular members, each having a first free end adapted to be positioned adjacent the back torso of the musician and a second free end adapted to extend outwardly from the front torso of the musician adjacent said second means, a first rigid member securing said first free end of each substantially L-shaped member in a spaced relationship, and a second rigid member securing said second free end of each substantially L-shaped member in spaced relationship, said first rigid member comprising an elongated member having a central shank adapted to extend along the upper back of said musician and supporting said first means and a pair of parallel end shanks angled with respect to said central shank, said end shank being slidably received in a said first end of said L-shaped tubular member and further comprising means for locking said end shanks in position with respect to said substantially L-shaped tubular members.

2. The carrier as defined in claim 1 and in which said fourth means is removably attached to the second free ends of said substantially L-shaped tubular members.

3. The invention as defined in claim 1 and wherein said third means includes at least one tubular member having an end portion aligned to extend forwardly of the person and said fourth means includes at least one member having a straight elongated portion dimensioned to be slidably received in said at least one tubular member.

4. The invention as defined in claim 1 and further comprising means for securing said first means to said central shank.

5. The invention as defined in claim 1 wherein said first means comprises a pair of spaced apart, curved pads, said pads including central rib portions along the curvature of the pads.

6. The invention as defined in claim 5 wherein said pads include a depending back engaging portion which interconnects said pair of pads and wherein said third means is secured to said depending back engaging portion.

7. A musical instrument carrier to be supported by the torso of a musician for transport of an instrument while the instrument is being played, said carrier comprising:

a first means for extending over and engaging the shoulders of the musician;

a second means for abuttingly engaging the front torso of the musician;

a third means for connecting said first means to said second means; and a fourth means connecting with said third means for supporting the instrument adjacent the front torso of the musician, said third means including means for adjustably and rigidly connecting said first means with respect to said second means to accommodate musicians of different sizes and shapes, said third means further comprising a pair of substantially L-shaped tubular members, each having a first free end adapted to be positioned adjacent the back torso of the musician and a second free end adapted to extend outwardly from the front torso of the musician adjacent said second means, a first rigid member securing said first free end of each substantially L-shaped member in a spaced relationship, and a second rigid member securing said second free end of each substantially L-shaped member in spaced relationship, said second rigid member being secured to the external surface of each second end of said substantially L-shaped tubular members and including a raised central portion extending upwardly above the second ends of said substantially L-shaped tubular members adjacent the front torso of the musician, and said second means being secured to said raised central portion.

8. The carrier as defined in claim 7 and in which said fourth means is removably attached to said second free ends of said substantially L-shaped tubular members.

9. The invention as defined in claim 7 wherein said first rigid member comprises an elongated member having a central shank and a pair of parallel end shanks angled with respect to said central shank, wherein each said end shank is slidably received in a said first end of said L-shaped tubular member and further comprising means for locking said end shanks in position with respect to said substantially L-shaped tubular members.

* * * * *